(12) United States Patent
Rudd et al.

(10) Patent No.: US 6,749,340 B1
(45) Date of Patent: Jun. 15, 2004

(54) LUBRICANT RESERVOIR FOR GAS BEARING

(75) Inventors: Gregory Ian Rudd, Aptos, CA (US); Raquib Uddin Khan, Pleasanton, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/691,304

(22) Filed: Oct. 17, 2000

Related U.S. Application Data
(60) Provisional application No. 60/160,481, filed on Oct. 19, 1999.

(51) Int. Cl.[7] ............................................. F16C 17/10
(52) U.S. Cl. ........................................................ 384/110
(58) Field of Search ................................ 384/110, 279, 384/107, 902, 108

(56) References Cited

U.S. PATENT DOCUMENTS

| | | | |
|---|---|---|---|
| 4,674,952 A | 6/1987 | Osterstrom | 415/170 R |
| 4,754,494 A | 6/1988 | Kumar | 384/112 |
| 4,767,265 A | 8/1988 | Osterstom | 415/170 R |
| 4,806,075 A | 2/1989 | Osterstrom et al. | 415/170 R |
| 5,018,881 A | 5/1991 | Asada | 384/113 |
| 5,102,237 A | 4/1992 | Ide | 384/224 |
| 5,173,797 A * | 12/1992 | Zedekar et al. | 384/110 |
| 5,459,674 A | 10/1995 | Ide et al. | 364/512 |
| 5,583,906 A | 12/1996 | Sugiura et al. | 378/132 |
| 5,660,481 A | 8/1997 | Ide | 384/122 |
| 6,364,532 B1 * | 4/2002 | Yoshikawa et al. | 384/107 |

* cited by examiner

*Primary Examiner*—Lenard A. Footland
(74) *Attorney, Agent, or Firm*—Moser Patterson & Sheridan, LLP.

(57) ABSTRACT

A method and apparatus is provided for allowing a molecularly thin film to be established on a surface of the gas fluid dynamic bearing. The film can be controllably replenished so that the problem of liquid lubricant starvation is overcome. A suitable non-sludging lubricant of low surface tension is held in a porous reservoir within the stationary portion of the bearing. This fluid migrates out of the reservoir to coat the contiguous bearing surfaces. Alternatively, the lubricant may be held in a porous reservoir within the rotating portion of the bearing; due to centrifugal force, as the rotating portion spins, the fluid is spun out and coats the opposite non-rotating surface. The reservoir may be replaced by a singular reservoir such as a simple hole, depression, cavity or groove filled with lubricant. The liquid may also migrate by capillary force through natural surface asperities or roughness by texturing the surface to promote capillary migration; or the distribution of the lubricant is accomplished by evaporation and condensation. The reservoir may be located in a region of the bearing that reaches a relatively higher operating temperature than the wear surfaces of the bearing. The transport of the lubricant then occurs by evaporation at the warmer reservoir, and condensation at the cooler bearing surface.

20 Claims, 4 Drawing Sheets

LUBRICANT RESERVOIR FOR GAS BEARING

CROSS-REFERENCE TO A RELATED APPLICATION

This application is based on provisional application Serial No. 60/160,481, filed Oct. 19, 1999, the priority of which is claimed.

FIELD OF THE INVENTION

This invention relates especially to gas or air bearings, and more specifically to method and apparatus to provide uninterrupted liquid thin film lubrication of at least one surface of an air bearing.

BACKGROUND OF THE INVENTION

Over the past several years, as a replacement for more commonly known ball bearing assemblies, the design of fluid dynamic bearings has progressed. In a typical ball bearing, the ball bearings are supported between a pair of races which allow relative rotation of the inner and outer pieces. However, ball bearing assemblies have many mechanical problems such as wear, run-out and manufacturing inconsistencies. Moreover, resistance to operating shock and vibration is poor because of small contact area and low damping. It is these issues which have led to the search for a replacement bearing assembly such as fluid dynamic bearings (FDB).

In a fluid dynamic bearing, a lubricating fluid such as a gas, or a liquid or air provides a bearing surface between a fixed member and a rotating member, or two relatively rotating members. The most common currently used fluid dynamic bearings include oil or ferromagnetic fluids. Such fluid dynamic bearings spread the bearing interface over a large continuous surface area in comparison with a ball bearing assembly which comprises a series of point interfaces defined by the ball and the race in which it rolls. This enlarged surface area is desirable because the increased bearing surface area reduces wobble or run-out between the relatively rotating members. Further, improved shock resistance and ruggedness is achieved with a fluid dynamic bearing. Also, the use of fluid in the interface area imparts damping effects to the bearing which helps to further reduce non-repeatable run-out.

Development has now been moved on to the use of gas as a fluid in the fluid dynamic bearing. Such gas fluid dynamic bearings have unsurpassed utility as bearings at very high rotational velocities, where highly concentric (low run-out) rotation is required. They are used in gyroscopes, turbochargers, and medical and dental equipment.

However, one difficulty in execution of gas bearings is the problem of startup and touchdown, when the surfaces are in contact. Contact results in wear, and wear particles and wear tracks in a tight bearing with submicron tolerances typical of gas bearings can cause catastrophic failures.

In most execution of such gas bearings, wear of the bearing surfaces is minimized by choosing a material, or pair of materials, that can rub against one another with minimum wear. The problem with this approach is that such materials are almost exclusively very hard and difficult to fabricate. Typical examples of such materials are ceramics, and ceramic-metal composites. Using these materials can make the cost of fabrication become the majority of the cost of the bearings. Another approach has been to apply lubricating or hard coating to the mating surfaces. This adds complexity, and may not be feasible, depending on the geometry of the bearing.

Liquid lubricants are well known to reduce wear between rubbing surfaces dramatically, often by many orders of magnitude. Even a layer as thin as a few molecules can be effective to reduce wear, and liquid or gelled liquid lubricants are used in most bearings other than gas bearings. Liquid lubricants have not been extensively used in gas bearings due to the complexity and difficulty of ensuring that the correct, minute amount of fluid is always present throughout the life of the bearing. Excess fluid can fill up the gap, causing the bearing to stick or malfunction. Too little fluid, or fluid loss, can lead to lubricant starvation and increased wear. Therefore, to overcome these problems, it is important to find a way to controllably apply or dispense a liquid lubricant to be used to lubricate at least one surface of a gas fluid dynamic bearing.

SUMMARY OF THE INVENTION

According to the present invention, a method and apparatus is provided for allowing a molecularly thin film to be established on a surface of the gas fluid dynamic bearing. It is further achieved in this invention that the film can be controllably replenished so that the problem of liquid lubricant starvation is overcome.

In one embodiment of the invention, a suitable non-sludging lubricant of low surface tension is held in a porous reservoir within the stationary portion of the bearing. This fluid migrates out of the reservoir to coat the contiguous bearing surfaces.

Alternatively, the lubricant may be held in a porous reservoir within the rotating portion of the bearing; due to centrifugal force, as the rotating portion spins, the fluid is spun out and coats the opposite non-rotating surface.

In a further alternative, the reservoir may be replaced by a singular reservoir such as a simple hole, depression, cavity or groove filled with lubricant.

In another alternative approach, the liquid will migrate by capillary force through natural surface asperities or roughness by texturing the surface to promote capillary migration; in yet another alternative, the distribution of the lubricant is accomplished by evaporation and condensation.

In yet another embodiment, the reservoir, which is as described above, is located in a region of the bearing that reaches a relatively higher operating temperature than the wear surfaces of the bearing. The transport of the lubricant then occurs by evaporation at the warmer reservoir, and condensation at the cooler bearing surface.

In yet another embodiment, the reservoir is located in a region of the bearing that contains gas at a relatively lower pressure than the gas above the wear surfaces of the bearing; once again, transport of the lubricant from the reservoir to the bearing surface occurs by evaporation from the reservoir and condensation at higher pressures.

Other features and advantages of the present invention will become apparent to a person of skill in the art who studies the following description of the preferred and exemplary embodiments, given in association with the following figures.

DETAILED DESCRIPTION OF THE PREFERRED EMBODIMENTS

Figure 1A:
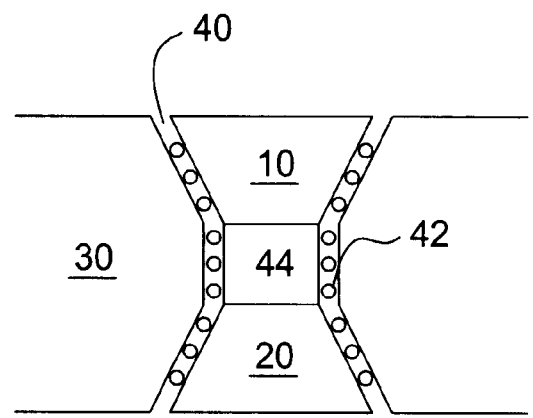
FIGS. 1A and 1B are vertical sectional views of gas fluid bearings in which the present invention is useful.
Figure 1B:
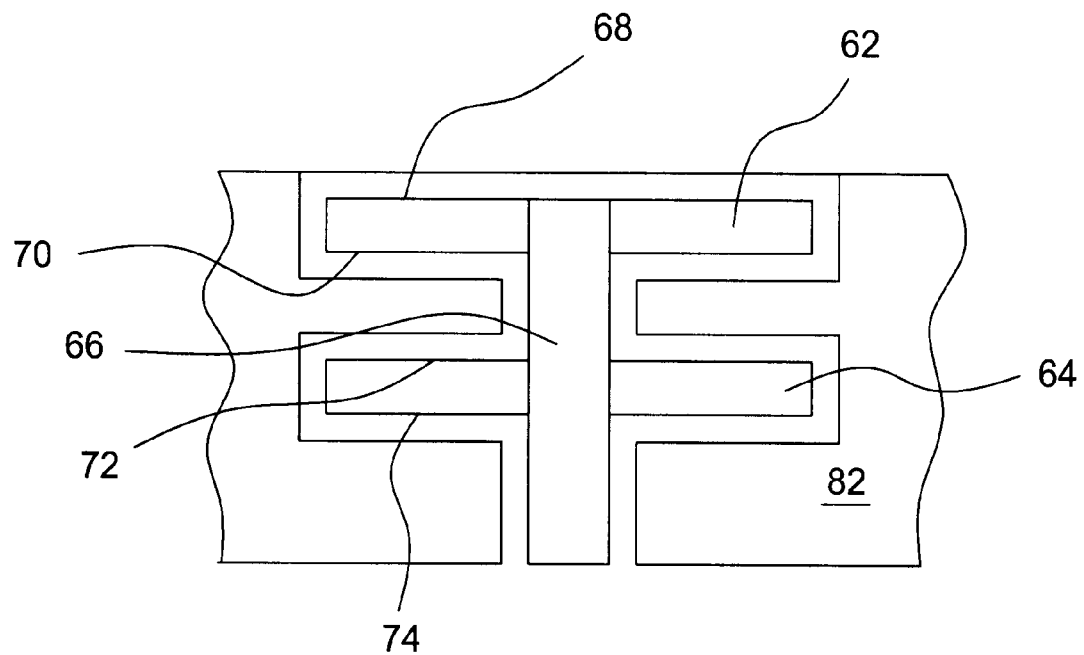

FIGS. 1A and 1B illustrate exemplary gas fluid bearings with which the present invention may be used. However, it should be recognized that the present invention is, for the most part, not design dependent, i.e. dependent on a specific design for the entire fluid bearing. The embodiments described above may be incorporated in the gas bearing shown in FIGS. 1A and 1B or in other bearing devices which are not shown herein and which are not equivalent to the designs in FIG. 1A. The design of FIG. 1A includes upper and lower cones 10, 20 joined by a journal section 44 which may or may not be included depending on the dual cone design. The cones are surrounded by a sleeve 30 and separated by a gap 40 in which a gas 42 is found. The gas provides the bearing to support relative rotation of the shaft or dual cones and the sleeve, either one of which may be fixed in place.

An alternative design is the spool bearing shown in FIG. 1B which includes upper and lower thrust plates 62, 64 joined by a journal bearing 66. The radial surfaces 68, 70 of thrust plate 62, and surfaces 72, 74 of thrust plate 64, typically will carry grooved patterns to establish the gas pressures necessary to support relative rotation of the two pieces. The journal bearing 66 also has grooves on one of the two surface regions. The gap is filled with gas which supports the spool and/or surrounding sleeve 82 for relative rotation.

As described above, and as becomes evident from a review of these embodiments, a clear problem occurs with the fact that especially with a gas bearing, it typically is not capable of supporting either the dual cones or the spool of FIG. 1B when no rotation is occurring. Thus referring next to FIG. 2 and the figures which follow, several approaches are disclosed to provide a continuous replenishment of a molecularly thin lubrication layer on one of the two surfaces of a gas fluid bearing. This would offer the advantages of wear protection, continuous replenishment, self-limiting thickness and the avoidance of an application process step.

Figure 2:
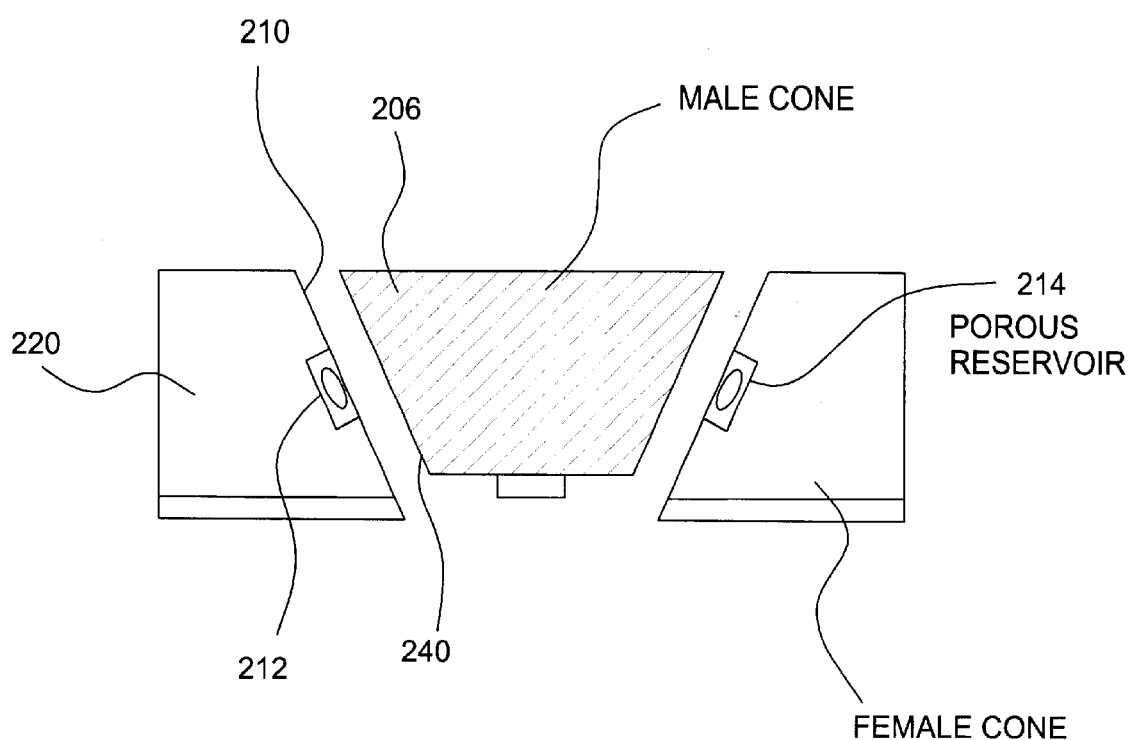
FIG. 2 is a partial sectional view of the cone and sleeve of one embodiment of the invention.

Referring, for example, to FIG. 2, one of the two surfaces of the conical bearing, and preferably in this case the outer or sleeve surface 210, includes a reservoir 212 which is filled with a suitable non-sludging lubricant of appropriately low surface tension. The reservoir which is more appropriately designated a porous reservoir will be filled with an appropriate porous material 214; the pore size will in fact have a bearing on the rate at which the lubricant or fluid leaves the reservoir to coat the desired surface. In this particular embodiment, it is assumed that the sleeve 220 is stationary. Due to the lowering of interfacial energy that occurs when a low surface tension fluid wets a solid, the fluid migrates out of this porous reservoir 212 to coat the contiguous bearing surfaces of the sleeve 210. The coating thickness itself is controlled and is self-limited by the choice of fluid viscosity, surface tension, vapor pressure, and as noted above the pore size in the reservoir. All of these parameters can be adjusted as a function of other design criteria of the bearing. The porous material could be a polymer, glass, metal, or ceramic chosen on the basis of the above criteria. The lubricant itself is chosen for its lubricity, migration character and/or vapor pressure. Further details of the desired lubricant characteristics will be described below in the present application.

Alternatively, the sleeve 220 may be considered to be the rotating element of the design, with the facing cone 206 being stationary. Now, the non-sludging lubricant of appropriate viscosity (and viscosity would be an important issue) is held in the porous reservoir 214 within the rotating portion of the bearing. Due to the inertia of the fluid mass located within the reservoir as it spins, imposing a centrifugal force on the fluid, the fluid is spun out and now coats the opposing, non-rotating surface 240. Once again, the choice of fluid viscosity, surface tension, vapor pressure and pore size in the reservoir control the coating thickness. The pore size of the reservoir has a most significant effect; small pores decrease the fluid vapor pressure and also slow the transport due to viscosity effects. Further, the selected parameters may also be affected by other design criteria of the bearing. The important thing is to understand the placement of the reservoir in the stationary or rotating piece, and the phenomena on which is then relied to coat either the surface where the reservoir is located or the opposing surface.

Figure 3A:
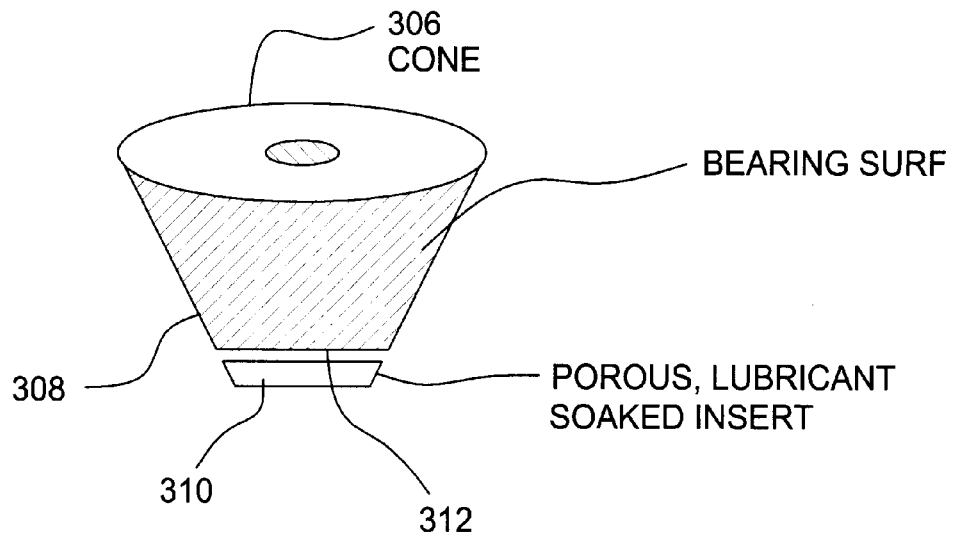
FIGS. 3A and 3B are partial sectional views of a bearing incorporating an insert soaked with a lubricant.
Figure 3B:
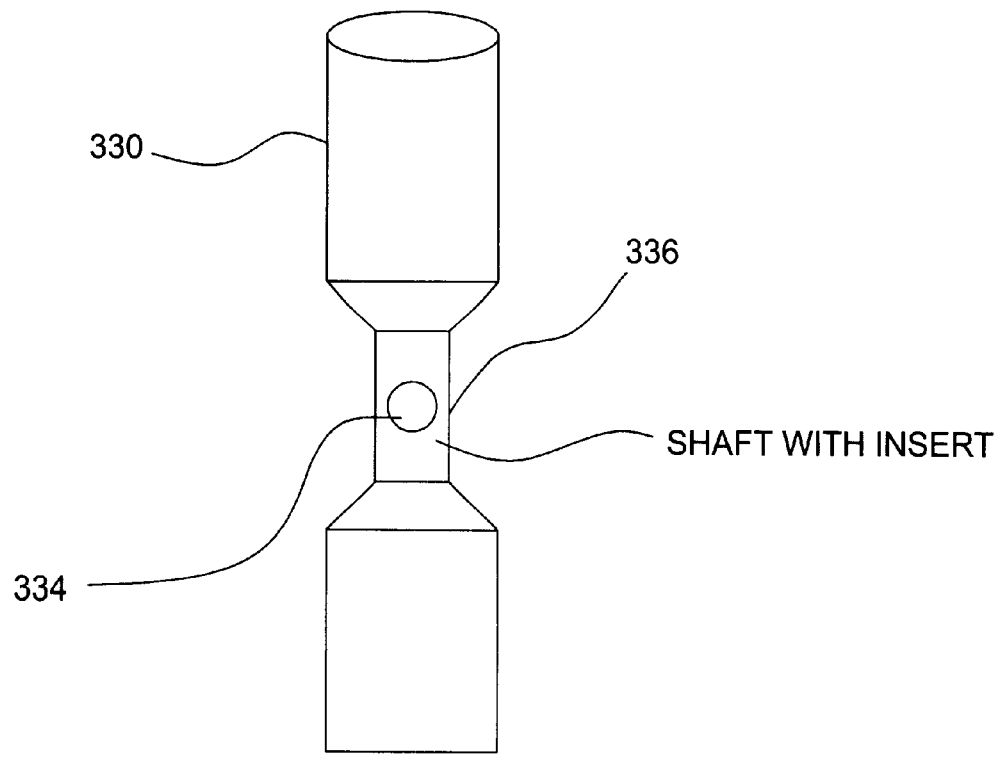

FIGS. 3A and 3B illustrate alternative approaches to the use of a porous lubricant soaked insert to supply the lubricant in the manner described above. For example, FIG. 3A shows a cone 306 used in the same way as the cone 206 of FIG. 2, and with a bearing surface 308 which must be protected during contact with the facing surface (which is not shown). Therefore, an insert 310 has been attached to the bottom surface 312 of the cone it may in fact be included between two complementary cones such as the cones 10, 20 of FIG. 1A. In either event, the lubricant will spread over the bearing surface 308 of the cone if the cone is stationary, or be dispensed by centrifugal force to impact and rest on the facing surface if the cone is rotating. An alternative approach is used in FIG. 3B where in this instance the shaft which is typically used to mount the two cones 10, 20 of the dual cone design of FIG. 1A or the two thrust plates of FIG. 1B is shown. In this instance, the shaft 330 includes an insert 334 in the center region 336 which is not covered by either the thrust plate or cones depending on the embodiment assembled. Once again, the porous material 334 of the insert is saturated, and creeps out over the part relying on migration due to disjoining pressure. Other phenomena which could drive the migration could be evaporation/condensation, or driven from a hot to a cold region, or from a region of low pressure to high pressure. Further, the shaft could be either fixed, or stationary as described above.

Figure 4:
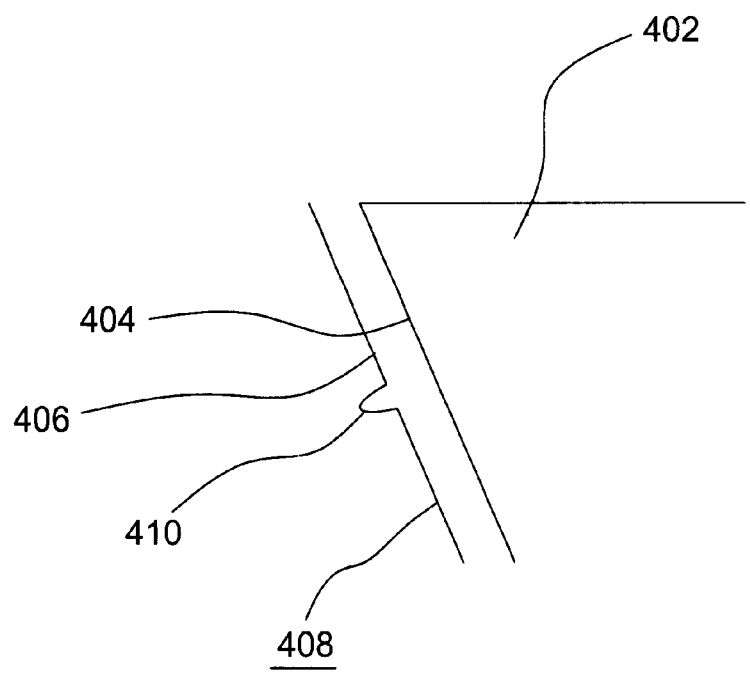
FIG. 4 illustrates a further alternative embodiment utilizing a hole or groove to hold the lubricant.

In yet another embodiment of the invention, shown in a partial sectional view of FIG. 4, the cone 402 has an outer bearing surface 404 facing an inner surface 406 of sleeve 408. A depression 410 which may be a simple hole, capillary or groove is provided filled with the lubricant. The lubricant appropriate chosen for its lubricity, migration character, and/or vapor pressure would not flow except under appropriate circumstances, given the right relationship of evaporation to condensation or the temperature or pressure in the region where the depression is provided. An alternative approach would be to provide the liquid which is to be distributed over a textured portion of the surface 406 which would provide more surface area for capturing and holding the liquid until it was redistributed by some phenomenon such as evaporation or condensation or pressure differential. Yet another alternative would be to allow the liquid to migrate by capillary force through natural surface asperities on the surface 406.

Figure 5:
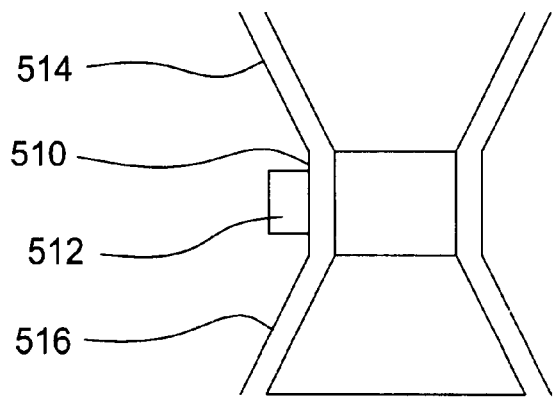
FIG. 5 is a partial sectional view of a conical bearing incorporating a further alternate embodiment of the invention.

In another especially preferred embodiment of the invention, the suitable non-sludging lubricant chosen for appropriate vapor pressure is held in a reservoir, such as the reservoir 212, 214 shown in FIG. 2, either a porous or singular reservoir. The reservoir is located in a region of the bearing that reaches a temperature during operation relatively higher than the wear surfaces of the bearing. The transport of the lubricant from the reservoir to the bearing surface would occur by evaporation at the warmer reservoir, and condensation on the cooler bearing surfaces. Thus, in contrast to the showing in FIG. 2, thus for example, referring to FIG. 5, the reservoir 212 would be located in an ungrooved region 510 of the bearing, as distinguished from the grooved regions 514, 516 when higher temperatures exist.

In yet another embodiment of the invention, the reservoir containing the liquid is located in a region of the bearing that contains gas at a relatively lower pressure than the gas above the wear surfaces of the bearing. The transport of the lubricant from the reservoir to the bearing surface would occur by evaporation from the reservoir and condensation in the gas at higher pressure adjacent to the bearing surfaces, resulting in impingement of the condensate on the surfaces and coating thereof.

In yet another variation, the distribution of the lubricant is accomplished not by fluid migration but by evaporation and condensation. All liquids exist in an equilibrium between vapor and liquid, and the amount of material which is partitioned between the vapor and liquid is determined by the vapor pressure of the liquid and the temperature and pressure of the system. Thus, by appropriate choices of the lubricant and the characteristics of the lubricant, any of the above approaches could be implemented. Many liquid lubricants thicken to make a sludge-like residue upon decomposing under wear conditions, and this factor is highly undesirable in bearings with the tight clearances of fluid dynamic bearings. Perfluoropolyethers (PFPEs) are the most preferred for such applications, because they generate volatile decomposition products. They also provide the added advantage of low surface tension and availability with a range of viscosity and vapor pressure values. Other lubricants such as organic esters and hydrocarbons may be suitable, possibly with appropriate additives.

Other features and advantages of this invention may occur to a person of skill in the art who studies this invention disclosure. Therefore, the scope of the invention is to be limited only by the following claims.

What is claimed is:

1. A fluid dynamic bearing comprising a pair of confronting surfaces separated by a gap, one of the surfaces supporting a grooved region to define the fluid dynamic bearing, a gas in the gap to support relative rotation of the surfaces, and a reservoir in one of the surfaces, the reservoir being located opposite the grooved region in the other of the surfaces and holding a non-sludging lubricant of sufficiently low surface tension that the lubricant can flow out of the reservoir during the rotation.

2. A fluid dynamic bearing as claimed in claim 1 wherein the reservoir is located in the stationary surface, and the lubricant's liquid is adapted to coat that same stationary surface to prevent scoring or other damage to the surface.

3. A fluid dynamic bearing as claimed in claim 1 wherein the lubricant in the reservoir coats the opposite surface.

4. A reservoir as claimed in claim 3 wherein the reservoir design is chosen from the group consisting of a hole, compression, capillary, or groove, and is filled with the lubricant.

5. A bearing as claimed in claim 1 wherein the reservoir is effectively provided by lubricant stored in the surface and migrating by capillary force through natural surface disparities, or by applying a special texture to the surface which promotes capillary migration.

6. A bearing as claimed in claim 1 wherein the reservoir is located in a region of the bearing and stores lubricant in a gas phase at a relatively lower pressure than the gas above the wear surfaces of the bearing, whereby transportation of the lubricant from the reservoir to the bearing surface occurs by evaporation from the reservoir in condensation at a higher pressure adjacent the bearing surfaces, resulting in impingement of the condensate on the surfaces.

7. A bearing as claimed in claim 1 wherein the reservoir is located in a region of the bearing that reaches a temperature during operation that is relatively higher than a wear surface of the bearing, the lubricant condensing on the cooler wear surface.

8. A bearing as claimed in claim 1 wherein the lubricant comprises perfluoropolyether.

9. A bearing as claimed in claim 1 wherein the lubricant is chosen from a group consisting of perfluoropolyether, organic ester, and hydrocarbon.

10. A fluid dynamic bearing comprising a pair of confronting surfaces separated by a gap, one of the surfaces supporting a grooved region to define the fluid dynamic bearing gas in the gap to support relative rotation of the surfaces, and reservoir means in one of the surfaces, the reservoir being located opposite the grooved region in the other of the surfaces and for holding a non-sludging lubricant of sufficiently low surface tension that the lubricant can flow out of the reservoir during the rotation.

11. A fluid dynamic bearing as claimed in claim 10 wherein the bearing is a conical bearing comprising a female cone sleeve having one of the confronting surfaces thereon defining a conical opening and supporting a male cone defining the other of the pair of conical surfaces for rotation therein.

12. A fluid dynamic bearing as claimed in claim 11 wherein the reservoir is included in the female conical bearing surface.

13. A fluid dynamic bearing as claimed in claim 12 wherein the reservoir is located in the female stationary surface, and the lubricant is adapted to coat the stationary surface to prevent scoring or other damage to the surface.

14. A fluid dynamic bearing as claimed in claim 12 wherein the lubricant in the reservoir coats the opposite surface.

15. A reservoir as claimed in claim 12 wherein the reservoir design is chosen from the group consisting of a hole, compression, capillary, or groove, and is substantially filled with the lubricant.

16. A bearing as claimed in claim 12 wherein the reservoir is effectively provided by lubricant stored in the surface and migrating by capillary force through natural surface disparities, or by applying a special texture to the surface which promotes capillary migration.

17. A bearing as claimed in claim 12 wherein the reservoir is located in a region of the stationary female conical bearing surface and stores lubricant in a gas phase at a relatively lower pressure than the gas above the wear surfaces of the bearing, whereby transportation of the lubricant from the reservoir to the bearing surface occurs by evaporation from the reservoir in condensation at a higher pressure adjacent the bearing surfaces, resulting in impingement of the condensate on the surfaces.

18. A bearing as claimed in claim 12 wherein the reservoir is located in a region of the stationary female conical bearing surface that reaches a temperature during operation that is relatively higher than a wear surface of the bearing, the lubricant condensing on the cooler wear surface.

19. A bearing as claimed in claim 12 wherein the lubricant comprises perfluoropolyether.

20. A bearing as claimed in claim 12 wherein the lubricant is chosen from a group consisting of perfluoropolyether, organic ester, and hydrocarbon.

* * * * *